INVENTORS.
MARSHALL L. SPECTOR
ROBERT D. JONES
CURTIS S. McDOWELL
BY
Curtis, Morris & Safford
ATTORNEYS INVENTORS.
MARSHALL L. SPECTOR
ROBERT D. JONES
CURTIS S. McDOWELL BY Curtis, Morris & Safford
ATTORNEYS

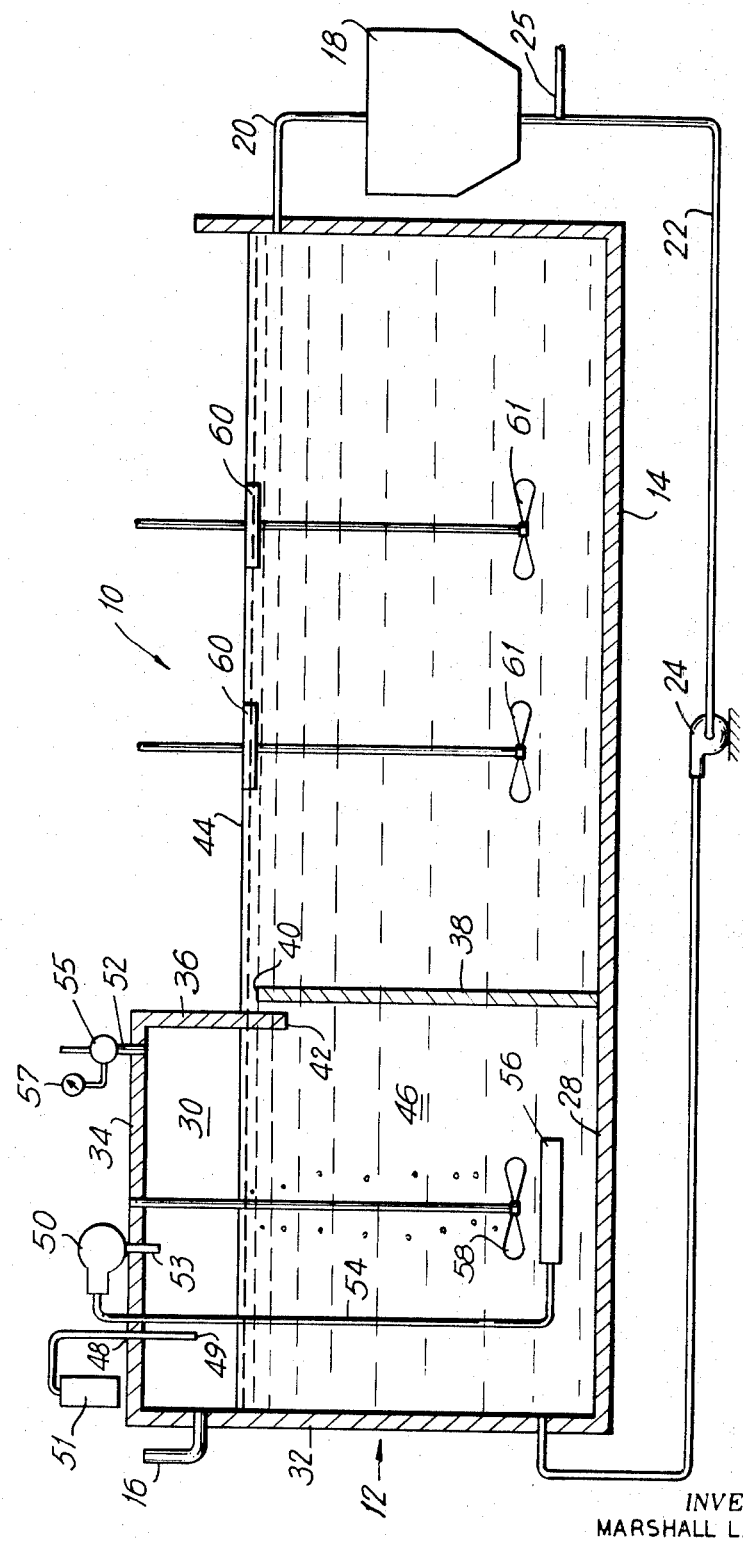

United States Patent Office 3,725,258
Patented Apr. 3, 1973

3,725,258
ACTIVATED SLUDGE SEWAGE TREATMENT PROCESS AND SYSTEM
Marshall L. Spector, Belle Mead, N.J., and Robert D. Jones, Allentown, and Curtis S. McDowell, Macungie, Pa., assignors to Air Products and Chemicals, Inc., Allentown, Pa.
Continuation-in-part of abandoned application Ser. No. 125,602, Mar. 18, 1971. This application Feb. 14, 1972, Ser. No. 226,199
Int. Cl. C02c 1/10
U.S. Cl. 210—7
7 Claims

ABSTRACT OF THE DISCLOSURE

An activated sludge sewage treatment process and system which includes an initial enclosed aeration chamber providing a vessel for a mixed liquor, formed from a liquid biologically degradable waste and recirculated sludge, wherein the liquor is aerated with an oxygen-rich aeration gas and maintained at a relatively high level of dissolved oxygen, and a subsequent open aeration chamber wherein the liquor, after being treated in the enclosed vessel, is aerated in the presence of atmospheric air at a substantially lower level of dissolved oxygen. The system is designed so that between 25 to 95%, and preferably 50 to 95%, of the total oxygen utilized by the mixed liquor, to effect biological degradation, is utilized by the liquor in the enclosed vessel, and the remainder of the oxygen utilized by the liquor for biological degradation is utilized by the liquor when the liquor is in the open aeration chamber.

CROSS REFERENCE TO RELATED APPLICATION

This application is a continuation-in-part of our copending application Ser. No. 125,602, filed Mar. 18, 1971, and now abandoned.

BACKGROUND OF THE INVENTION

This invention relates to an activated sludge sewage treatment process and system and, more particularly, to a process and system which more efficiently utilizes oxygen-rich aeration gas.

It is well established that domestic sewage, as well as waste from commercial and chemical operations which create a biologically degradable material, should be treated before being discharged into a receiving body or stream of water. Various processes and systems have been proposed for treating such waste, one of the most popular of which process is the well-known activated sludge process.

Briefly stated, the conventional activated sludge process mixes the liquid waste to be purified with activated sludge to form a mixed liquor. This mixed liquor is aerated with an oxygen-containing gas such that the microorganisms consume and digest the organic wastes as food. These living organisms require oxygen to sustain their metabolic function such that they grow and multiply thereby rapidly consuming the organic wastes. The microorganisms are relatively dense such that they can be separated in a subsequent settler or clarifier. The effluent from the settler is substantially purified since most of the organic wastes have been removed by the microorganisms, and this purified effluent can then be discharged into a natural body of water without causing pollution. Some of the settled microorganisms, which are commonly referred to as "activated sludge," are returned to the inlet end of the aeration tank so as to maintain a desired level of microorganisms in the mixed liquor thereby continuing the biological process.

From the foregoing brief and simplified description of the activated sludge process, it is apparent that an adequate supply of oxygen is critical to the biological process. Thus, the prior art has long recognized that the use of an aeration gas having an oxygen content higher than the 21% of oxygen present in air is highly advantageous. For example, the use of high oxygen containing aeration gases has been suggested in such prior patents as 2,684,-941; 3,462,275; 3,236,766 and 3,356,609. However, none of these proposed systems or processes proved to be commercially acceptable for a variety of technical reasons including, for example, the high cost of relatively pure oxygen, and the improper structural and process conditions under which the high oxygen containing gases were proposed to be utilized. More recently, the cost of high purity oxygen has substantially decreased, and systems such as those disclosed in Pats. 3,547,811 through 3,547,-815 have suggested the use of oxygen-rich gas in closed aeration tanks. However, such systems require enclosing the entire aeration tank, and the oxygen-rich gas which is initially introduced into the closed aeration tank is used to supply all of the oxygen demand of the entire aeration system.

In contrast to the processes and systems disclosed in all of these prior patents, the present invention is based upon the discovery that, under certain structural and process conditions, all of the advantages of using oxygen-rich aeration gas may be obtained by limiting the use thereof to an initial portion of the total aeration process, and that substantial capital and operating costs may be obtained by using free atmospheric air in the later portion of process. In addition, the present invention provides further advantages by maximizing the effective utilization of the oxygen-rich gas which is supplied to the initial portion of the aeration process.

SUMMARY OF THE INVENTION

It is a principal object of the present invention to provide an improved activated sludge process and system for treatment of organic wastes which utilizes oxygen-rich aeration gas in such a manner that all of the benefits of using oxygen-rich gas are obtained while, at the same time, utilizing substantially smaller amounts of such relatively expensive oxygen-rich gas, and less costly aeration chambers.

According to the present invention, the activated sludge sewage treatment process and system includes an initial closed aeration chamber into which mixed liquor, comprising aqueous waste and recycled sludge, is aerated in contact with an oxygen-rich aeration gas; the phrase "oxygen-rich aeration gas" being defined herein as an aeration gas comprising at least 35% oxygen, by volume, and preferably 50 to 99.9% oxygen by volume. In at least the first portion of this enclosed aeration chamber, the dissolved oxygen content of the mixed liquor is maintained at a relatively high level such as between 3 and 15 p.p.m., and preferably between 5 and 10 p.p.m. After the aeration period in the closed chamber in contact with the oxygen-rich aeration gas, the mixed liquor is discharged into one or more open aeration chambers wherein further aeration is accomplished with atmospheric air at relatively lower dissolved oxygen levels until the purification process is completed to the desired degree.

BRIEF DESCRIPTION OF THE DRAWING

FIG. 1 is a schematic and diagrammatic sectional side view showing an activated sludge system in accordance with the present invention;

FIGS. 2 and 3 are schematic and diagrammatic sectional side views of alternative embodiments of the enclosed chamber of the activated sludge system of the present invention.

Figure 4:
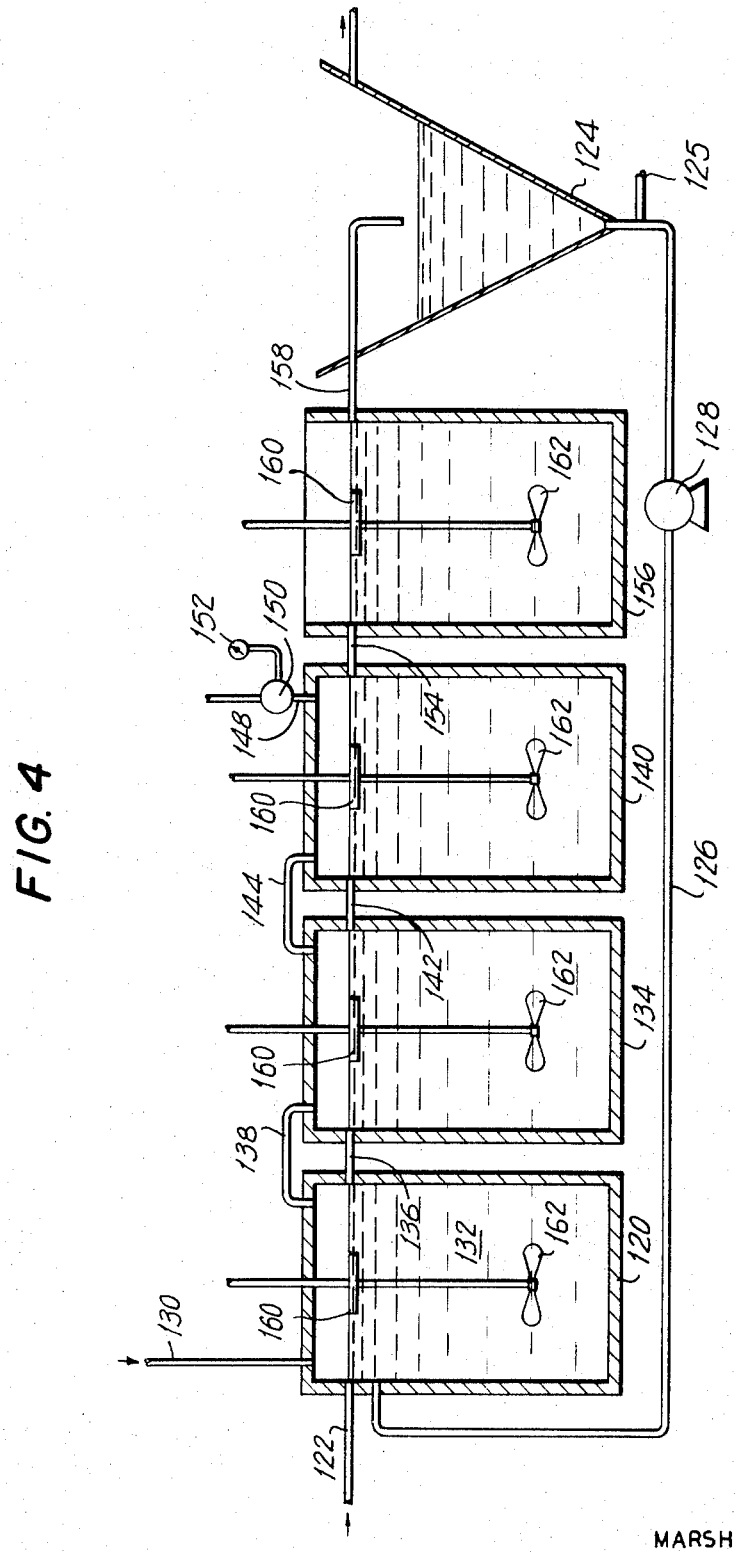
FIG. 4 is a schematic and diagrammatic sectional side view showing another alternate embodiment of the activated sludge system of the present invention.

With reference now to the drawing and particularly FIG. 1, there is shown an activated sludge sewage treatment facility 10 which includes an initial enclosed aeration chamber or tank 12, and a subsequent open aeration chamber or tank 14. An inlet 16 is provided in the initial aeration chamber 12 to allow influent waste, with or without pretreatment in a primary sedimentation tank (not shown), to enter the enclosed aeration tank 12. A clarifier or settling tank 18 receives the aerated mixed liquor from aeration tank 14 through a supply line 20. Clarifier 18 functions in the conventional manner in that the sludge settles to the bottom of the clarifier and the purified effluent is discharged from the upper portion of the settler over a conventional weir or other discharge means not shown. A portion of the sludge is removed from clarifier 18 and recirculated through line 22 by a pump 24 to the enclosed aeration chamber 12 to provide the microorganisms to furnish the activated sludge in the activated sludge treatment facility 10. The remainder of the sludge is withdrawn from the settling tank 18 through line 25 for appropriate disposition.

Aeration chamber 12 is a closed chamber including a bottom wall 28, upstanding side walls 30 and an end wall 32 which are closed by a top wall 34. A front wall member 36 depends from the top wall 34 and an upstanding front wall member 38 spaced forwardly if the wall portion 36 extends upwardly from bottom wall 28 to a termination 40 which is slightly higher in elevation than the lower portion 42 of depending wall member 36. Level 40 of front wall 38 is below the surface level 44 of the mixed liquor 46 which includes the influent waste from inlet 16 and sludge recirculated from the sedimentation tank 18. Thus, because partial front wall portion 36 extends below the level of the liquid level 44, a closed aeration chamber is formed and liquid flows from aeration chamber 12 to aeration chamber 14 over the upstanding wall member 38.

As previously stated, the mixed liquor 46 comprising the influent waste and recirculated activated sludge is initially treated in the presence of an oxygen-rich aeration gas. Accordingly, aeration chamber 12 is provided with a gas inlet 48 in top wall 34 through which oxygen-rich aeration gas is supplied to the chamber above the surface 44 of the liquor. The oxygen-rich aeration gas is obtained from a source 51 and may be supplied to aeration chamber 12 through supply line 49. A recirculation pump 50 is provided having a suction end 53 communicating with the interior of aeration chamber 12 to withdraw oxygen-rich aeration gas from the aeration chamber 12 above the surface of the liquor, and is pumped by pump 50 through a line 54 to one or more submerged diffusers 56 so that the oxygen-rich gas is allowed to bubble up through the mixed liquor 46. Agitators 58 are also preferably provided to agitate the mixed liquor 46 to increase the efficiency of the oxygen transfer from the oxygen-rich aeration gas to the mixed liquor 46, and to maintain the solid waste material in suspension.

A gas vent 52 is provided in top wall 34 to vent gases to the atmosphere and the vent 52 is equipped with a flow control valve 55 which is equipped with an oxygen analyzer 57. The oxygen analyzer 57 determines the percentage of oxygen in the vented gases and is used to control valve 55 to open or close the valve in order to maintain a predetermined desired oxygen content in the vented gas for reasons which will subsequently be described.

Preferably, the oxygen-rich aeration gas is supplied from source 51 under a regulated pressure such that the gas may be fed to the enclosed aeration chamber on a demand basis. That is, when the gas pressure in the chamber 12 falls below the regulated pressure at which oxygen-rich aeration gas is supplied, because oxygen is being transferred to the mixed liquor 46, more oxygen-rich aeration gas is supplied from source 51 through line 49. Valve 55 remains closed until the analyzer detects an oxygen purity below the desired level before opening again to vent gas to the atmosphere. Recirculation pump 50 operates continuously throughout the process and thereby circulates oxygen-rich aeration gas to the diffuser 56 to be bubbled up through the mixed liquor 46 to enable oxygen to be transferred to the mixed liquor.

After the mixed liquor 46 has been treated in enclosed aeration chamber 12, as will be explained more fully hereinbelow, the mixed liquor flows over the upstanding front wall member 38 into open aeration chamber 14 where the mixed liquor is further aerated by a plurality of surface aerators 60 in an atmospheric environment until the treated mixed liquor flows through line 20 to the sedimentation tank 18. Below the surface agitators 61 may also be employed to maintain the solids in solution and prevent settling in the aeration chamber 14.

Figures 2, 3:
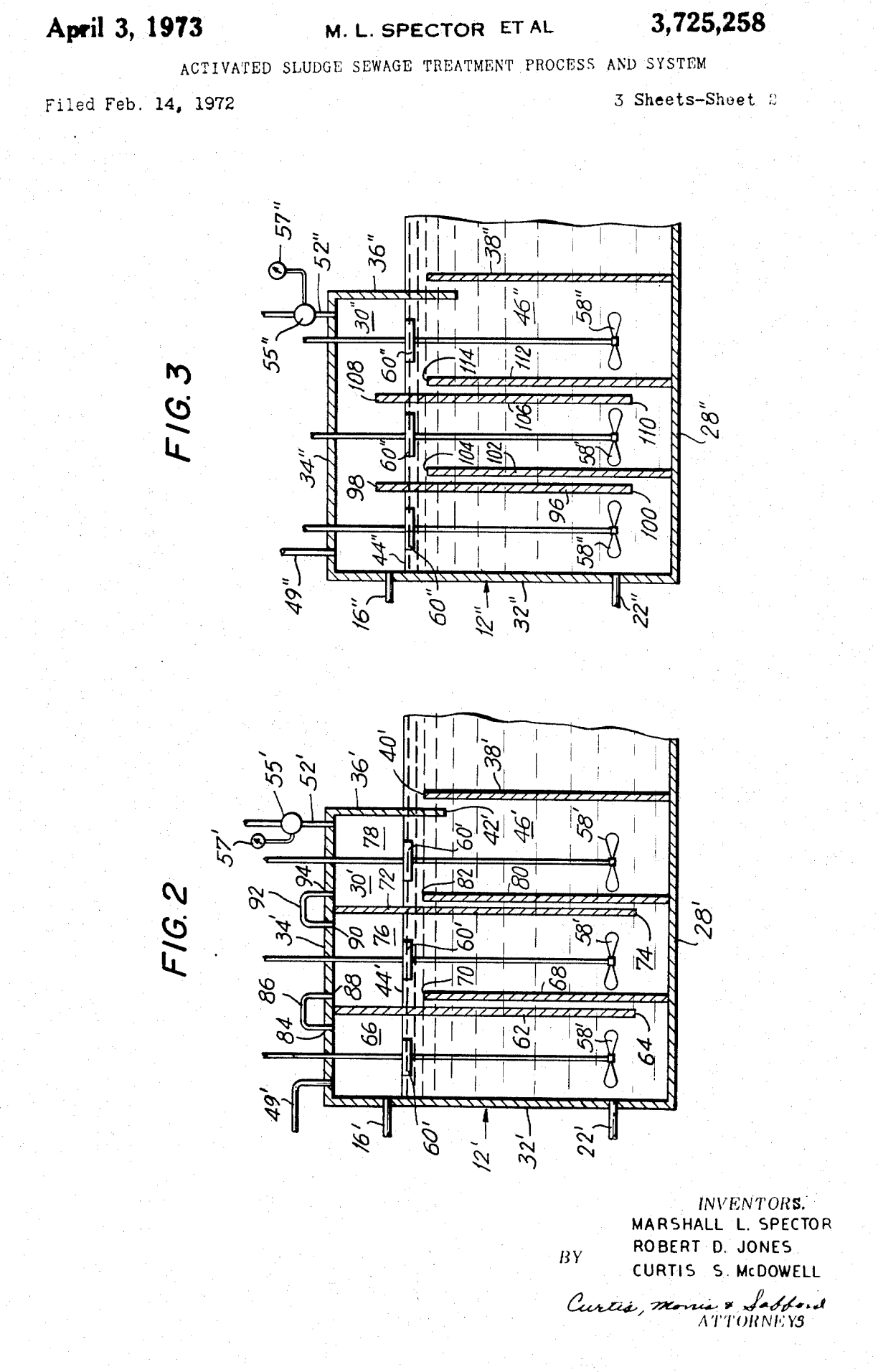

FIGS. 2 and 3 show alternate constructions for the enclosed aeration chamber and it is seen in FIG. 2 that aeration chamber 12' includes a bottom wall 28', side walls 30', end wall 32', a top wall 34' with depending partial front wall portion 36' and an upstanding front wall segment 38' spaced forwardly of depending front wall portion 36' as in the embodiment of FIG. 1. Aeration chamber 12' also includes a first depending wall member 62 which depends from top wall 34' to a level 64 above bottom wall 28' to define a first sub-chamber 66. An upstanding wall member 68 is provided spaced forwardly of wall 62 and terminating at a level 70 below the surface 44' of the liquor. Walls 62 and 68 cooperate to provide a restricted flow passage for the liquor from sub-chamber 66.

A second depending wall 72 spaced forwardly of upstanding wall 68 extends to a level 74 above bottom wall 28' to define second and third sub-chambers 76 and 78, respectively. An upstanding wall segment 80 is also provided in sub-chamber 78 spaced forwardly of wall 72 which extends upwardly from bottom wall 28' to a level 82 below the surface 44' of the mixed liquor 46'. Wall 80 cooperates with wall 72 to provide a restricted flow passage for the liquor from sub-chamber 76 to sub-chamber 78.

An oxygen-rich aeration gas inlet 49' is also provided in the first sub-chamber 66, and a vent 52' including a control valve 55 and oxygen analyzer 57' is provided in the third sub-chamber 78.

A gas exhaust outlet 84 is provided in sub-chamber 66 which is interconnected by a line 86 to a gas inlet 88 in sub-chamber 76 and a gas exhaust outlet 90 is connected by a line 92 to a gas inlet opening 94 in sub-chamber 78 so that the gas flow is staged within aeration chamber 12' between the sub-chambers or stages 66, 76 and 78, respectively, before being exhausted through exhaust opening 52'. Agitators 58' are also preferably provided in each of the sub-chambers 66, 76 and 78 to keep the solids suspended in the mixed liquor in each sub-chamber, and preferably surface aerators 60' are also provided to increase the oxygen transfer efficiency between the oxygen present in the oxygen-rich aeration gas and the mixed liquor.

In the embodiment shown in FIG. 2, the mixed liquor and the oxygen-rich aeration gas are both staged sequentially between sub-chambers 66, 76, 78. The oxygen-rich aeration gas supplied through inlet line 49' to sub-chamber 66 from the source may be supplied to sub-chamber 66 under demand pressure as in the embodiment shown in FIG. 1. Thus, when the gas pressure within aeration chamber 12' falls below the regulated pressure at which the oxygen-rich gas is supplied, additional oxygen-rich aeration gas will flow from the source through supply line 49' to sub-chamber 66 in aeration chamber 12'.

Vent control valve 55' and analyzer 57' function in the same manner as valve 55 and analyzer 57 in the embodiment of FIG. 1 but, because gas flow is staged between the sub-chambers the oxygen content of the vent gas can be regulated to maintain an oxygen content of the vent gas to a very low value such as, for example, that of atmospheric air (i.e., 20.8% oxygen) or any other oxygen concentrations above or below that of air. Accordingly, with the analyzer 57' and control valve 55' set to throttle vent gas flow when the oxygen content of the vent gas is at or below 20.8% oxygen, valve 55' closes whenever the analyzer 57' detects an oxygen content greater than 20.8% oxygen.

When valve 55' closes, the pressure within aeration chamber 12' has a tendency to build up to a level in excess of the regulated pressure at which oxygen-rich gas is supplied to aeration chamber 12' through supply line 49'. Hence, no further oxygen-rich aeration gas flows into chamber 12'. While the chamber 12' is in this closed state, the liquor 46' is aerated in each of the sub-chambers in the presence of the oxygen-rich aeration gas until sufficient oxygen is transferred to the mixed liquor so as to reduce the gas pressure within chamber 12' to allow additional oxygen-rich aeration gas to flow into the first chamber, or to deplete the oxygen content of the gas in sub-chamber 78 to a concentration at or below 20.8%, in which event, valve 55' opens and vents the oxygen depleted gas to the atmosphere. When valve 55' is open, the gas pressure in chamber 12' is reduced to allow additional oxygen-rich gas to flow into the chamber through supply line 49'.

In this mode of operation it will be apparent that the aeration gas is vented only when the oxygen has been dissolved into the mixed liquor to such an extent that the oxygen concentration in the vent stage is equal to that of air. In this case, the more costly, higher purity oxygen is most completely and effectively utilized. In practice, however, it is not necessary nor always desirable to vent the oxygen-depleted aeration gas with an oxygen content of exactly 20.8%, such as for example, where a high proportion of the vent gas is carbon dioxide. Thus, the present invention contemplates controlled venting of the areation gas at the lowest possible oxygen concentration consistent with the oxygen concentration of the oxygen-rich feed gas and the particular composition and strength of the influent waste to be treated. However, for most waste materials, and particularly those comprising municipal sewage, it has been discovered that maximum utilization of the oxygen-rich feed gas is obtained by venting the gas at a predetermined and controlled oxygen content in the range of 10% to 35% oxygen (by volume), and most preferably in the range of 21% to 25% oxygen, by volume.

Reference is now made to FIG. 3, where enclosed aeration chamber 12'' is shown including bottom wall 28'', side walls 30'', end wall 32'' with depending front wall portion 36'' and upstanding front wall segments 38'' as in the embodiments of FIGS. 1 and 2. Within enclosed aeration chamber 12'' a partial wall segment 96 extends between the side walls 30'' from a level 98 above the surface level 44'' of the mixed liquor 46'' to a level 100 spaced above bottom wall 28''. A partial upstanding wall segment 102 extending upwardly from bottom wall 28'' between end walls 30'' to a level 104 below the surface level 44'' of the mixed liquor 46'' is provided spaced forwardly of wall segment 96 to form a restricted flow passage in the liquor. A second partial wall segment 106 is provided spaced forwardly of wall segment 102 and is similar to wall segment 96. Wall segment 106 extends between side walls 30'' terminating at a level 108 and 110 above the surface level of the liquor and spaced from bottom wall 28'', respectively. A partial upstanding wall segment 112 extends upwardly from bottom wall 28'' and terminates at a level 114 below the liquor surface level and is spaced forwardly of wall 106 to provide a restricted flow passage for the liquor.

An oxygen-rich gas inlet line 49'' is provided in top wall 34'' as well as a gas vent 52'', control valve 55'' and analyzer 57'', as in the embodiment of FIG. 1. Suitable agitators 58'' may also be provided to maintain the solids in suspension as well as, surface aerators 60'' for aerating the mixed liquor. The enclosed chamber above the surface of the liquor 46'' is subjected to the same uniform gas pressure as in the embodiment of FIG. 1 while flow of the mixed liquor through aeration chamber 12'' is staged.

With reference to FIG. 4, an activated sludge sewage treatment process is shown which is similar to the embodiment shown in FIG. 2 but wherein physically separate aeration chambers are utilized with staged gas flow between the enclosed aeration chambers.

In this embodiment, a first enclosed aeration chamber 120 receives influent waste through a waste supply line 122 and recycled sludge from a settling tank 124 through line 126. A purge line 125 is also provided for appropriate disposition of the sludge. The recycled sludge is pumped through line 126 by pump 128. Oxygen-rich aeration gas is supplied on demand to enclosed chamber 120 through supply line 130, and both the liquor 132 and aeration gas is staged from the first enclosed aeration chamber 120 to a second enclosed aeration chamber 134. The liquor is staged through a suitable conduit 136 and the aeration gas through line 138. Similarly, the liquor and gas is staged to a third enclosed aeration chamber 140 through appropriate conduits 142 and 146, respectively.

From enclosed aeration chamber 140 the gas is vented to the atmosphere through vent line 148 controlled by a control valve 150 and oxygen analyzer 152 as in the embodiment of FIG. 2.

The liquor is staged from enclosed chamber 140 through conduit 154 to an open aeration chamber 156 for final aeration before flowing to the settling tank 124 through conduit 158.

Suitable surface aerators 160 and below surface agitators 162 may also be provided in each aeration chamber 120, 134, 140 and 156.

Thus, it will be apparent that enclosed chambers 120, 134 and 140 collectively function in the same manner as the single enclosed chamber 12' of FIG. 2 wherein the chamber 12' is subdivided into separated stages by baffles 62, 68, 72, 80, 36' and 38'. Therefore, the phrase "enclosed aeration zone" as used herein is intended to include both a single chamber, with or without either or both of the liquid or gas baffles, as shown in FIGS. 1–3, as well as, a plurality of individually enclosed chambers, as shown in FIG. 4, the latter of which collectively function as a single enclosed aeration zone.

As noted hereinabove, the greatest demand for oxygen in an activated sludge sewage treatment facility occurs in the inlet end of the aeration tank when the influent waste, and the microorganisms in the recirculated sludge are initially mixed together such that the microorganisms are in their maximum growth phase. Thus, in the present invention, the oxygen-rich aeration gas is utilized only in the enclosed aeration zone to provide between 25–95%, and preferably 50–95%, of the total oxygen transferred to all of the mixed liquor in the complete aeration process, and the remaining oxygen demand is supplied by aeration with air in a subsequent, open aeration tank.

In a laboratory simulation of the process and system of the present invention, three test runs were made and an analysis of the test runs is presented in the table below. Test runs 1 and 2 used a synthetic organic waste water comprising a solution made up of 256 parts glucose, 256 parts glycine, 57 parts aniline, 57 parts sodium acetate, 11.4 parts phenol, 28.2 parts ammonium sulfate and 19 parts phosphoric acid. Water was then added to the solution to make a 3000 ml. total to provide a stock solution which had a COD of 215,000 mg./l. This stock solution was then diluted with water to obtain the COD values of the influent for Runs 1 and 2.

The mixed liquor was staged between three twelve liter vessels maintained at two-thirds liquid level to a settling tank. Each of the vessels was provided with an overflow weir so that mixed liquor from the first vessel overflowed to the second vessel and mixed liquor from the second vessel overflowed to the third vessel with the overflow from the third vessel flowing into the settling tank. In the settling tank the effluent from the aeration basin was allowed to settle and a portion of the sludge from the settling tank was recycled to the first stage vessel. The synthetic organic influent waste water was pumped into the first vessel and was agitated by diffusion of an enriched oxygen bearing gas which was bubbled through the mixed liquor through a diffuser plate near the bottom of the vessel at the rate of 6 liters of gas per minute. The oxygen content of the gas bubbled through the mixed liquor in the first stage was adjusted to provide an oxygen-rich aeration gas. The oxygen content of the gas bubbled through the later stages was maintained at less than 20.8% oxygen in order to demonstrate operation with atmospheric air or less.

This highlights the adequacy of air, or even oxygen lean air to function effectively in the open atmospheric stage of the processing system of the present invention, when the initial stage is aerated with an oxygen-rich aeration gas according to the principles of the present invention.

Test run 3 was conducted similar to test runs 1 and 2 except that the first stage vessel was enclosed with a cover and equipped with a recycle compressor to more nearly simulate the first stage of the processing system of the present invention. Test run 3 also utilized an actual organic waste from a chemical processing plant instead of the synthetic organic waste used in test runs 1 and 2.

Test run 4 was performed in a pilot plant apparatus using the configuration shown in FIG. 4 with waste material obtained from a municipal waste treatment facility. The four aeration chambers used in test run 4 had a total liquid volume of approximately 89 gallons and the process was carried out at an average temperature of 14° C.

The results of the four test runs are summarized in the table below.

TABLE.—SUMMARY OF OPERATIONAL CONDITIONS AND RESULTS FOR A STAGED ENRICHED OXYGEN-AIR ACTIVATED SLUDGE TREATMENT PROCESS

| Run | 1 | 2 | 3 | 4 |
|---|---|---|---|---|
| Percent sludge recycle | 31 | 49 | 37 | 31 |
| Detention time (each stage, hours)[1] | .53 | .38 | 1.17 | .41 |
| Detention time (overall, hours)[1] | 1.58 | 1.13 | 3.51 | 1.66 |
| Influent flow rate (liters/day)[1] | 255 | 313 | 103 | 4,950 |
| COD $_{influent}$ (mg./liter) | 252 | 483 | 785 | 281 |
| BOD$_5$ $_{influent}$ (mg./liter) | 188 | | 280 | 119 |
| COD $_{effluent}$ (mg./liter) | 22 | 22 | 259 | 130 |
| BOD$_5$ $_{effluent}$ (mg./liter) | 3–4 | | 30 | 15 |
| Percent COD removed | 91 | 95 | 67 | 59 |
| Percent BOD removed | 98 | | 89 | 87 |
| MLSS (mg./liter) | 5,880 | 9,480 | 7,450 | 3,800 |
| MLVSS (mg./liter) | 5,345 | 8,638 | 6,332 | 3,200 |
| TSS$_{SR}$ (total suspended solids-sludge recycled, mg./liter) | 24,086 | 27,521 | 23,400 | 14,500 |
| VSS$_{SR}$ (volatile suspended solids-sludge recycled, mg./liter) | 23,480 | 24,741 | 20,000 | 12,200 |
| F/M COD $_{1st\ stage}$ (weight of COD/ weight of MLSS per 24 hours) | 1.65 | 2.40 | 2.2 | 5.7 |
| F/M COD $_{Overall}$ (weight of COD/ weight of MLSS per 24 hours) | .55 | .80 | .74 | 1.43 |
| Sludge detention time (hours) in settler | | 1.3 | 4.8 | |
| SVI (sludge volume index, ml./g. TSS) | 94 | 78 | 100 | 72 |
| $dO_2/dt$: | | | | |
| 1st stage (mg./l./hours) | 181 | 268 | 168 | 86 |
| 2nd stage (mg./l./hours) | 66 | 81 | 69 | 65 |
| 3rd stage (mg./l./hours) | 51 | 70 | 34 | 37 |
| 4th stage (mg./l./hours) | | | | 38.5 |
| Percent O$_2$ in gas: | | | | |
| (1st stage) | 50 | 63 | 80 | 68 |
| (2d stage) | 12 | 14 | 10 | 39 |
| (3d stage) | 5 | 11 | 10 | 15 |
| (4th stage) | | | | 20.8 |
| Dissolved oxygen: | | | | |
| 1st stage (p.p.m.) | 10 | 10 | 30 | 11 |
| 2nd stage (p.p.m.) | 1–2 | 1–2 | 1–2 | 11 |
| 3rd stage (p.p.m.) | 1–2 | 1–2 | 1–2 | 4.2 |
| 4th stage (p.p.m.) | | | | 3.8 |

[1] Operation of Test Runs 1, 2, and 3 based on 22 hour day; 2 hours per day used for analytical procedures.

As is evident from the table, the dissolved oxygen level for the first stage of Runs 1 and 2 were held at 10 p.p.m., the first stage of Run 3 was held at 30 p.p.m. and the first stage of Run 4 was held at 11 p.p.m. by varying the oxygen content of the gas aerated through the first stage vessel. For Run 1 a 50% oxygen rich gas was used, for Run 2 a 63% oxygen rich gas was used, for Run 3 an 80% oxygen rich gas was used and for Run 4 a 99.5% oxygen feed was used to maintain a 68% oxygen-rich aeration gas above the mixed liquor in the first stage in order to maintain the observed dissolved oxygen levels.

From a determination of the miligrams of oxygen utilized per liter of mixed liquor per hour ($dO_2/dt$) it is seen that in Run 1 in all three stages the total miligrams of oxygen utilized per 3 liters per hour is 298 mg., of which 181 mg. or approximately 61% of the total oxygen utilized was utilized in the first stage. Similarly, for Run 2, it can be seen that approximately 64% of the total oxygen utilized was utilized in the first stage, and for Run 3, approximately 62% of the total oxygen utilized was utilized in the first stage. For Run 4 it is seen that for all four stages the total of the weight of oxygen utilized was 226.5 mg. per 4 liters per hour of which 188 mg. or 84% of the total oxygen utilized was utilized in the enclosed aeration zone comprising stages 1, 2 and 3.

It is also interesting to note that Run 4 was conducted on a demand feed basis with the vent gas in the third enclosed stage being controlled by a valve which was manually throttled responsive to the oxygen content as determined by an oxygen analyzer to maintain a 15% oxygen content of the vented gas. It can also be seen how the oxygen-rich aeration gas varied in oxygen content as it was staged from stage to stage since the oxygen in the gas was progressively utilized by the mixed liquor.

It is also significant to note that all runs showed high percentages of COD (chemical oxygen demand) and BOD (biological oxygen demand) removed while maintaining an acceptable sludge volume index, which is an indication of the liquid volume occupied by one gram of dried sludge. These results were also achieved by maintaining an oxygen-rich aeration gas only in the first stage for Runs 1–3 and first two stages for Run 4 and, in fact, providing an oxygen lean gas (a lower percentage of oxygen than found in atmospheric air) in the final closed stage. This serves to highlight the adequacy of atmospheric air for utilization in the open atmospheric stage of the processing system of the present invention, and shows that oxygen-rich aeration gas need only be utilized at the most critical stage of oxygen demand, i.e. when the sewage influent and recycled sludge are initially mixed together.

While the foregoing examples utilized oxygen-rich feed gases having oxygen concentrations between 50% and 99.5%, it will be apparent that the preferred oxygen concentration of the oxygen-rich aeration gas is a function of the efficiency of the oxygen dissolution equipment; i.e. the submerged spargers, mixers and surface aerators. Also, the preferred oxygen concentration of the oxygen-rich aeration gas is a function of the strength of the influent waste, and the levels of the dissolved oxygen (D.O.) which is to be maintained in the mixed liquor. Thus, it has been found that oxygen-rich aeration gases having oxygen concentrations as low as 35% by volume may be used for low strength wastes, particularly where high efficiency dissolution equipment is employed. Furthermore, it has been found that, although the specific examples utilized between 60–84% of the total oxygen demand in the enclosed aeration zone, low strength wastes may be successfully treated in accordance with the present invention by satisfying as low as 25% of the total oxygen demand by aeration with the oxygen-rich gas, and satisfying the remaining oxygen demand with atmospheric air. In addition, the above examples unexpectedly showed that, when high dissolved oxygen levels in the order of 10 p.p.m. or greater are maintained in at least the first portion or stage of the enclosed aeration zone, the D.O. levels in subsequent portions or stages of the total aeration zone may be substantially lower, such as for example, decreasing to as low as 1–2 p.p.m. in the final portion of the aeration zone.

Lastly, it has been found that the volume of mixed liquor in the enclosed aeration zone contacted with the oxygen-rich aeration gas should comprise more than one-third of the total volume of the mixed liquor in the complete aeration system. Alternatively, the detention time of the mixed liquor in the closed, oxygen-rich aeration zone should be at least 20 minutes, and preferable in the order of 60 to 90 minutes or greater in the case of high strength wastes.

From the foregoing description of several preferred embodiments, it will be apparent that the present inventiion achieves substantial savings in the amount of relatively costly oxygen-rich aeration gas which is required to achieve all of the advantages of using high oxygen containing gases while, at the same time, substantially decreasing the capital cost of the total aeration system.

What is claimed is:

1. A method of reducing the biological oxygen demand (BOD) of a biodegradable waste to a final predetermined level in an activated sludge treatment process comprising the steps of:
    (a) mixing a biodegradable waste influent and recirculated activated sludge to form a mixed liquor,
    (b) continuously aerating said mixed liquor in a covered aeration zone out of contact with atmospheric air and in repeated contact with an oxygen-rich aeration gas comprising at least 50% oxygen by volume for a period of time greater than 30 minutes and sufficient to satisfy at least 50% but less than 95% of the total BOD reduction of the mixed liquor while simultaneously maintaining a dissolved oxygen level in said mixed liquor of at least 6 p.p.m. in at least the first portion of said covered aeration zone,
    (c) continuously further aerating said partially BOD reduced mixed liquor in a subsequent aeration zone in repeated contact with a second aeration gas essentially comprising atmospheric air for a period of time sufficient to reduce the remaining BOD of said mixed liquor to said final predetermined level,
    (d) continuously discharging said BOD reduced mixed liquor from said subsequent aeration zone and separating said mixed liquor into a purified effluent and activated sludge, and
    (e) recycling at least a portion of said separated activated sludge for mixing with biodegradable waste influent according to step (a).

2. The method as claimed in claim 1 wherein said mixed liquor is aerated in said covered aeration zone in contact with said oxygen-rich aeration gas for at least 60 to 90 minutes.

3. The method as claimed in claim 1 wherein said mixed liquor is aerated in at least the first portion of said covered aeration zone at a rate of oxygen transfer sufficient to maintain a dissolved oxygen level within the range of 6–15 p.pm.

4. The method as claimed in claim 1 wherein said mixed liquor is aerated in a first portion of said covered aeration zone while maintaining said high level of dissolved oxygen of at least 6 p.p.m., and is subsequently aerated in at least a second portion of said covered aeration zone while maintaining a dissolved oxygen level lower than in said first portion, and is further aerated in said subsequent aeration zone while maintaining a still lower dissolved oxygen level.

5. The method as claimed in claim 1 wherein said oxygen-rich aeration gas is vented from said covered aeration zone only when the oxygen content thereof is decreased to within the range of 20% to 25% by volume.

6. An activated sludge aeration system for reducing the BOD of an influent waste to a final predetermined level comprising:
    (a) means forming a first aeration zone,
    (b) inlet means for introducing biodegradable waste and activated sludge forming a mixed liquor in said first aeration zone,
    (c) cover means extending over said first aeration zone forming an enclosed gas aeration chamber above the level of said mixed liquor,
    (d) partition means dividing said enclosed gas aeration chamber into a plurality of aeration gas stages,
    (e) passage means for passing aeration gas from one aeration gas stage to the next,
    (f) aeration gas inlet means for introducing oxygen-rich aeration gas comprising at least 50% oxygen into the first of said aeration gas stages,
    (g) surface aerator means in each of said aeration gas stages for mixing and recirculating said mixed liquor in repeated oxygen transfer contact with the oxygen-rich aeration gas in each stage, the number and size of said surface aerator means being sufficient to maintain a dissolved oxygen level of at least 6 p.p.m. in at least the first portion of said covered aeration zone and sufficient to supply at least 50% of the total BOD of said mixed liquor in said covered aeration zone,
    (h) conduit means in fluid communication with the last aeration gas stage for discharging aeration gas of reduced oxygen content therefrom,
    (i) valve means in said conduit means for discharging oxygen depleted aeration gas from said last stage when the oxygen content thereof is reduced to a predetermined level,
    (j) means forming a subsequent aeration zone in fluid communication with atmospheric air and in liquid communication with said covered aeration zone, the volume of said covered aeration zone comprising more than one third of the total volume of said covered and subsequent aeration zones, and
    (k) additional surface aerator means in said subsequent aeration zone for further aerating said partially BOD reduced mixed liquor in repeated contact with a second aeration gas essentially comprising atmospheric air, the number and size of said additional surface aerator means being sufficient to supply the remaining BOD reduction of said mixed liquor to said final predetermined level.

7. The activated sludge aeration system as claimed in claim 6 further including oxygen sensing means in said last aeration gas stage for sensing the oxygen content of the aeration gas in said last stage and actuating said valve means to open said valve means and discharge oxygen depleted aeration gas only when the oxygen content thereof is reduced to a concentration between 20% and 35% by volume.

References Cited

UNITED STATES PATENTS

| | | | |
|---|---|---|---|
| 3,444,076 | 5/1969 | Sekikawa | 210—15 X |
| 3,547,815 | 12/1970 | McWhirter | 210—15 X |
| 3,547,811 | 12/1970 | McWhirter | 210—15 X |
| 3,054,602 | 9/1962 | Proudman | 210—220 X |

MICHAEL ROGERS, Primary Examiner

U.S. Cl. X.R.

210—15, 96, 195, 220